United States Patent
Lamb, Sr.

Patent Number: 5,380,180
Date of Patent: Jan. 10, 1995

[54] APPARATUS FOR MAKING PRESSBOARD FROM POLY-COATED PAPER USING RELATIVE MOVEMENT OF FACING WEBS

[75] Inventor: Vernon L. Lamb, Sr., Sparta, Mich.

[73] Assignee: Fortifiber Corporation, Los Angeles, Calif.

[21] Appl. No.: 809,437

[22] Filed: Dec. 17, 1991

Related U.S. Application Data

[60] Division of Ser. No. 584,595, Sep. 18, 1990, Pat. No. 5,137,668, which is a continuation-in-part of Ser. No. 383,208, Jul. 21, 1989, abandoned.

[51] Int. Cl.⁶ .............................................. B29C 43/00
[52] U.S. Cl. .................................. 425/111; 156/547; 156/555; 156/583.1; 425/115; 425/335; 425/363; 425/394; 425/505
[58] Field of Search ........... 156/547, 550, 555, 583.1, 156/583.91; 425/83.1, 110, 111, 115, 335, 363, 394, 505

[56] References Cited

U.S. PATENT DOCUMENTS

| | | | |
|---|---|---|---|
| 524,746 | 8/1894 | Weber | 425/115 |
| 1,185,142 | 5/1916 | Stewart | 428/50 |
| 1,266,766 | 5/1918 | Brandenberger | 156/550 |
| 1,862,688 | 6/1932 | Loetscher | 162/225 |
| 2,057,167 | 10/1936 | Sherman | 264/112 |
| 2,181,556 | 11/1939 | Wells | 162/176 |
| 2,222,633 | 11/1940 | Sheesley | 425/82.1 |
| 2,619,681 | 12/1952 | Baker et al. | 264/319 |
| 2,773,297 | 12/1956 | Cotchett | 156/276 |
| 3,011,938 | 12/1961 | Chapman | 162/124 |
| 3,021,244 | 2/1962 | Meiler | 156/50 |
| 3,032,820 | 5/1962 | Johnson | 264/112 |
| 3,183,141 | 5/1965 | Holden et al. | 156/202 |
| 3,226,458 | 12/1965 | Graff et al. | 425/115 |
| 3,235,530 | 2/1966 | Crouch et al. | 264/140 |
| 3,309,444 | 3/1967 | Schueler | 264/109 |
| 3,367,828 | 2/1968 | Carter et al. | 162/225 |
| 3,481,818 | 12/1969 | Wellen | 425/115 |
| 3,511,750 | 5/1970 | Hider | 428/461 |
| 3,718,536 | 2/1973 | Downs et al. | 264/257 |
| 3,857,752 | 12/1974 | McCoy | 428/74 |
| 3,977,928 | 8/1976 | Odagiri et al. | 156/62.2 |
| 3,994,769 | 11/1976 | Gersbeck | 156/499 |
| 4,086,313 | 4/1978 | Axer et al. | 264/70 |
| 4,097,209 | 6/1978 | Garrick et al. | 425/82.1 |
| 4,111,730 | 9/1978 | Balatinecz | 156/62.2 |
| 4,111,744 | 9/1978 | Reiniger | 162/100 |
| 4,146,660 | 3/1979 | Hall et al. | 428/2 |
| 4,382,758 | 5/1983 | Nopper et al. | 425/82.1 |
| 4,396,566 | 8/1983 | Brinkmann et al. | 264/70 |
| 4,448,739 | 5/1984 | Baus | 264/132 |
| 4,810,445 | 3/1989 | Lamb et al. | 264/112 |
| 4,957,930 | 7/1986 | Szal | 264/115 |

FOREIGN PATENT DOCUMENTS

| | | | |
|---|---|---|---|
| 2555506 | of 1984 | France | |
| 842267 | 5/1952 | Germany | 425/115 |
| 3246451 | 7/1984 | Germany | 156/547 |
| 500041 | of 1970 | Switzerland | |
| 2051658 | of 1978 | United Kingdom | |

Primary Examiner—Charles S. Bushey
Attorney, Agent, or Firm—Price, Heneveld, Cooper, DeWitt & Litton

[57] ABSTRACT

A system and process for fabricating pressboard from shredded paper coated with a thermoplastic material and a pair of facing webs includes placing the shredded poly-coated paper between the two traveling webs to form a composite, the composite then being passed in a manner to heat the thermoplastic material above its softening point to differentially repeatedly shift the traveling webs linearly relative to each other and to the shredded paper for enhanced bonding of the shreds to themselves and to the facing webs by passing them around a series of heated rollers defining a serpentine path, and then pressing the composite together while curing to bond the components, and cooling the product.

5 Claims, 1 Drawing Sheet

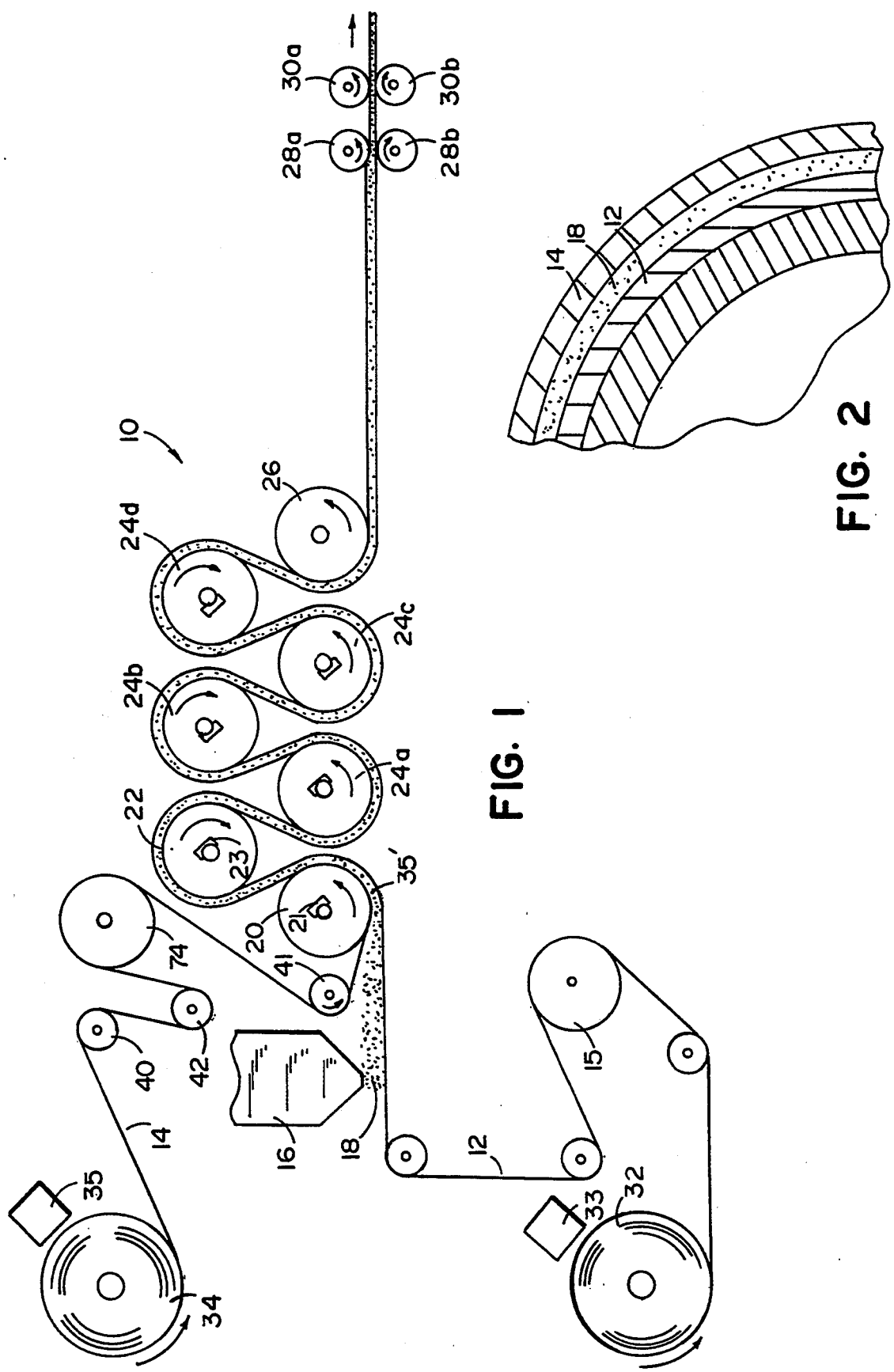

APPARATUS FOR MAKING PRESSBOARD FROM POLY-COATED PAPER USING RELATIVE MOVEMENT OF FACING WEBS

This is a divisional of co-pending application Ser. No. 07/584,595 now U.S. Pat. No. 5,137,668, filed on Sep. 18, 1990, entitled METHOD FOR MAKING PRESSBOARD FROM POLY COATED PAPER USING RESTIVE MOVEMENT OF FACING WEBS, this application being a continuation-in-part of application Ser. No. 07/383,208 filed Jul. 21, 1989, entitled APPARATUS AND METHOD FOR MAKING PRESSBOARD FROM POLY-COATED PAPER USING RELATIVE MOVEMENT OF FACING WEBS, now abandoned.

BACKGROUND OF THE INVENTION

The present invention pertains to an apparatus and a method for fabricating pressboard product, and in particular, pressboard formed from a filler comprising primarily shredded paper coated with a thermoplastic material, with or without additional thermoplastic maternal.

Papers coated with a thermoplastic material (poly-coated papers) are utilized in a variety of applications. In one such application, kraft paper is coated with polyethylene to create roll headers utilized in the paper manufacturing industry. However, the use of poly-coated paper invariably generates waste or scrap, typically as a result of cutting the desired final product from blanks of sheet stock. For example, the poly-coated roll headers are round and therefore leave a relatively large offal portion when cut from rectangular sheet stock. The disposal of such material has proven to be difficult, time consuming and/or expensive. The polymer component largely prevents normal processing of the paper component since it causes plugging of drainage screens, among other things. The scrap paper and polymer may be treated as waste and hauled to a landfill or incinerator for proper disposal. However, landfill disposal is very expensive in terms of both hauling costs and landfill fees; and in many states certain regulatory agencies can prohibit disposal in a Landfill and/or incineration of such a product.

Alternatively, the scrap paper may be recycled the fabrication of a pressboard product. One such apparatus and process for producing pressboard from scrap poly-coated paper is disclosed in U.S. Pat. No. 3,718,536, issued Feb. 27, 1973 to Downs et al., and entitled COMPOSITE BOARD AND METHOD OF MANUFACTURE. However, the method and apparatus disclosed by Downs et al. includes a mere pressing of the board elements together. Further, the Downs et al. system involves only a batch processing of the scrap paper, and as such has an associated low output and high cost. Although the Downs et al. patent represents as a possibility that the composite board could be manufactured continuously (column 5, lines 31–42) no useful, operative and/or practical apparatus or method whatsoever is set forth for a continuous implementation.

Another apparatus and process for producing pressboard from shredded poly-coated paper is set forth in Applicant's U.S. Pat. No. 4,810,445, issued Mar. 7, 1989. In this system, the pressboard is formed continuously by depositing shredded poly-coated paper onto a first web or sheet, heating the thermoplastic material to its softening point, placing a second web or sheet atop the poly-coated paper to thereby sandwich it between the two webs, and then utilizing pinch rolls to apply a pressing force to compress the elements together. One difficulty in this regard is that of obtaining optimum bonding within the shredded material and of the shredded material to the webs, for strength of product and ability to score.

SUMMARY OF THE INVENTION

A unique apparatus and method are provided for forming a pressboard product from paper coated with a thermoplastic material including forming of a composite by positioning of shredded poly-coated paper as the filler between a pair of opposed facing continuous webs, heating the composite sufficiently to soften the polymer while not heating and pressing such composite to cause bonding of the materials, causing the webs to move linearly back and forth relative to each other while advancing them under heated conditions, thereby causing a polymer smearing action between the webs, and then causing the polymer to bond the filler and webs together with passage between nipping rollers and cooling. Optionally, additional polymer can be incorporated into the shredded stock that forms the composite filler. The webs and contained filler are moved linearly relative to each other in respective directions, and then in opposite respective directions by passing them over a series of heated rolls defining a serpentine path. Passing the arranged materials along the serpentine path while the polymer is heated functions to linearly move and rub the facing webs relative to the coated shredded paper therebetween, smearing the polymer. This development has been found to create a superior pressboard product having a stronger and more uniform bonding of the materials.

The invention therefore not only alleviates the disposal problem heretofore associated with the scrap, but, also produces a superior article useful for more applications. The pressboard fabricated in accordance with the present invention can, if desired, be utilized for slid sheets, as packing separators, as a substitute for corrugated cardboard et al. The thickness of the final product can be controllably varied, e.g. 60 point to 150 point thickness, or higher.

These and other objects, advantages and features of the invention will be more readily understood and appreciated by reference to the detailed description of the preferred embodiment and the drawings.

BRIEF DESCRIPTION OF THE DRAWINGS

FIG. 1 is a schematic elevational view of the pressboard manufacturing system of the present invention; and FIG. 2 is an enlarged view of a portion of the apparatus and material in FIG. 1.

DETAILED DESCRIPTION OF THE PREFERRED EMBODIMENT

The system 10 for fabricating a pressboard product from shredded paper coated with a thermoplastic material includes first and second facing webs 12 and 14, here shown as lower and upper webs, a hopper 16 depositing the shredded poly-coated paper 18 between webs 12, 14, and a series of heated rolls defining a serpentine path through which the materials pass.

In the initial phases of the operation, the poly-coated paper is shredded by being passed through a chopper (not shown) which cuts, grinds, mills or otherwise forms the waste paper into pieces which may be approximately three-eighths inch square. Other sizes can be produced depending on the product to be manufactured. Preferably, to ensure smooth operation, the material should be reduced in size sufficiently to be readily flowable through hopper 16.

A typical poly-coated paper presently is a 42-pound kraft paper coated with polyethylene at a rate of approximately 14.4 pounds of polymer per basis (i.e. 3,000 square feet). However, many other types and mixtures of paper and thermoplastics can be utilized, as well as variations in the amount of thermoplastic used. Other thermoplastics might include polymerized olefins (e.g. polyethylene, polypropylene and polybutylene), polymerized vinyls (e.g. polyvinylchloride, polyvinylacetate and various other vinyl polymers) and the like. These are examples. The material must be heated above the softening temperature of the particular thermoplastic material or mixture of materials present.

The poly-coated paper 18, once shredded, is loaded along with any supplemental polymeric materials added, into hopper 16 as the filler. Hopper 16 has a large open upper end (not shown), into which the shredded material 18 from the chopper is received, and a restricted opening lower end through which the filler 18 is controllably fed. In the embodiment depicted, it is fed continuously onto the traveling lower web 12. Rotatable agitators may be provided within hopper 12 to ensure that the shredded poly-coated paper 18 is continually loosened and separated to drop therethrough at a generally constant rate and prevent clogging and fouling of the operation. A rotatable dispensing roll (not shown) may be used to dispense the shreds at the uniform selected rate. Adjustment of this feed rate and of the feed rate of the webs enables the ultimate desired thickness of product to be produced.

The webs 12, 14 are preferably uncoated 42-pound kraft in any selected width, e.g. ten feet. The thickness of the webs may be varied for the desired end product. Thinner webs can be employed than is normally possible with the specific process illustrated in prior U.S. Pat. No. 4,810,445, because that process involved pulling a long section of web stock through the heating zone, whereas the rollers in the present system can be individually driven to assist in advancing the composite. The webs can be poly-coated, at least on the inward side facing the received shredded paper 18, to enhance adhesion of the facing webs to the shredded material. If the rolls have conventional release materials thereon, then the outer sides of the webs can be poly-coated. Alternatively, the webs could be of a material other than paper, e.g. polymeric film stock, or combinations of materials. The facing webs 12, 14 are normally dispensed from a pair of supply rolls 32, 34, respectively, for travel along predetermined paths. The rolls have control brakes 33 and 35 (schematically depicted) to regulate feed therefrom.

More specifically, in the embodiment depicted, roll 32 is mounted upstream of hopper 16 so that a lower facing web 12 is passed beneath hopper 16 to receive from the hopper a steady feed of shredded poly-coated paper 18. Lower web 12 is shown traveling over an idler drum or roll to a first preheat roll 15 and then, if necessary, to a second preheat roll (not shown), following which web 12 is guided to pass beneath the hopper for deposit of the shredded polymer coated paper 18 thereon. Lower web 12 is fed at a constant rate along an underlying support conveyor (not shown), although other motive and/or support means could be used. To ensure that the filler formed primarily; of poly-coated shredded paper 18 is generally uniformly spread over lower web 12, a rotating leveling paddle may be mounted directly downstream of hopper 16, and rapidly rotated by a conventional motor in a direction opposite the movement of the web, to smooth out high spots in the shred material.

Simultaneously, upper web 14 passes around a pair of idlers 40 and 42 to a first preheat roll 74 and from thence to a second preheat roll 41, after which it joins the first web 12 and the shredded paper layer thereon. The preheat rolls dry off moisture which might cause bonding problems in the composite product or could cause moisture blow as the composite material subsequently passes through the serpentine path on the subsequent rolls. Such preheating rolls furthermore cause air in the webs to expand and thereby degas the webs so that any blowing action resulting will not occur on the subsequent rolls. Such moisture blowing or air blowing actions, if occurring on the serpentine path rolls, would tend to disrupt the bonding or cause blowout of the shredded paper fill because one surface of the composite is adjacent the metal surface of the roll. Hence, all moisture and air being driven out would have to pass through the shredded paper and then either laterally or through the second web. Consequently, it is significant that the moisture be driven off and the webs degassed prior to the composite material entering the serpentine path. The shredded paper 18 is thus between webs 12, 14, thereby forming a multiple layer composite 35.

In some instances, it may be desirable to supply additional polymer to the shreds to increase the polymer to paper ratio of the filler layer. Instead of the exemplary arrangement of the webs depicted with a lower web and an upper web moving generally horizontally, the webs could conceivably travel generally vertically, e.g. converging toward each other and toward shredded poly-coated paper deposited therebetween. Conceivably the shredded material could also be extruded between the webs.

After the facing webs 12, 14 and shredded paper 18 have been sandwiched together, they are first passed partially around one roll of the first pair of heated rolls. This first pair of rolls 20 and 22 is controllably spaced apart by stops 21 and 23, an amount less than the total thickness of two webs and the loose filler to be fed between the rolls. The thickness of the composite is thereby reduced to control caliper, improve heat transfer from succeeding rolls to the composite, and to place the components into closer relationship for subsequent bonding. At this point, the polymer is not yet heated sufficiently to be ready to bond.

The somewhat reduced thickness composite 35' is then advanced in a manner to cause repeated back and forth linear movement of each web relative to the other and relative to the filler. The composite is advanced around the series of rolls 24a, 24b, 24c and 24d which define a serpentine path. These rolls are preferably driven synchronously at the same peripheral speed rate by a conventional chain drive or other known means (not shown). These rolls may be converted from typical drying rolls of paper mill, but positioned to advance the composite sandwich as necessary for this invention. The rolls are depicted in sets generally in alignment with each other as explained hereinafter. However, they can be staggered to create a sharper angle of web travel. These rolls are heated sufficiently to elevate the temperature of the sandwich above the softening point of the particular thermoplastic used to effect bonding of the shredded poly-coated paper 18 together and to facing webs 12, 14. This heating may be effected in any desired manner, e.g. by propane firing within rolls, by flowing hot oil through the rolls, by electrically generated heat, with radiant heaters, or otherwise, such that convection, conduction and/or radiant heating techniques may be involved. The shredded paper stock and/or the webs may also be heated apart from the rolls. The polymer must be softened to a workable state.

The rolls are usually heated to about 500° F., a temperature near but below the flash point of the paper webs (often about 540° F.), so that the composite may be processed as quickly as possible. This is a temperature which is substantially higher than the softening temperature of most thermoplastics, and therefore acts to quickly soften the polymeric material. For example, the softening temperature for polyethylene is about 240° F. The roll temperature can be varied in accordance with the softening temperature of the polymer, the rate of processing feed, and the paper flash point temperature. The processing rate will vary with the use of different papers, different thermoplastics, and different thickness of product.

The rolls may vary in size, i.e. may be about 10 inches in diameter or, in larger operations, typically 36 inches or 42 inches in diameter. The web feed rate can vary greatly, e.g. about 3.5 feet per minute on small scale equipment, or 100 feet per minute or more on large installations. The number of rolls can be varied to suit the situation, as can the geometric path configuration, to achieve the desired differential linear movement between the webs. A final heated roll 26 leads to the nip rolls. These nip rolls 28a and 28b, and 30a and 30b, are in pairs at the tail end of the sequence, and have an overdrive relation relative to the preceding larger rolls. That is, the peripheral surface speed of these nip rolls is purposely greater than that of the preceding driven rolls. The resulting differential pulling action is beneficial in preventing the inner web on each preceding roll from bulging due to its tendency to have a greater relative speed than the outer web, aiding in causing linear relative slippage between the webs and between the inner web and the filler. As noted, a key aspect of this invention is to cause the spaced webs to move linearly relative to each other and the filler therebetween in a manner to cause a smearing action of the softened polymer and a rubbing action between the webs and the filler. It is therefore essential that the webs go through a series of such linear back and forth shifting motions relative to each other and the shredded stock therebetween. This ultimately produces a final pressboard having enhanced structural integrity, and also tends to remove any high spots, i.e. uneven spots due to localized bunching of the shredded paper.

The nip rolls are unheated, preferably in two pairs, with the two rolls in each pair being set closer together than the prior heated rolls. These nip rolls press the composite to the final caliper desired and also instigate curing of the polymer. The first pair of nip rolls, i.e. upper roll 28a and lower roll 28b, preferably guide the composite through an angle approaching but not equal to 180°, e.g. around 170°-175°, so as to be 5°-10° off. This causes a soft angle bending of about 5°-10° in one direction which, when passed subsequently through the second pair of nip rolls 30a and 30b which bend the composite a few degrees in the opposite direction, serves to prevent wrinkling of the resulting product. Overall, the final nip pressure or bias applied to the product can vary but should usually be at least about 500 pounds per linear inch to assure effective bonding. The preferred range is 500 to 1500 pounds per linear inch. Above 1500 pounds, kraft paper starts to break down, causing a different surface character and/or a different color. Thus, if the webs are of kraft paper, the pressure should normally be kept below this amount.

The pressboard is then allowed to cool to effect bonding solidification of the thermoplastic. While a specific cooling station may be utilized if desired, it is generally found to be unnecessary since a path of travel away from the heated rollers while exposed to ambient air is normally adequate.

Various thicknesses of product can be fabricated. Typically the range will be about 30 to 150 point in thickness (i.e. 0.030 to 0.150 inch).

Suitable reinforcing stock can be incorporated into the product as by blending it between the shredded paper and one or both webs, or conceivably incorporating such into the middle of the shredded paper. This may be done by applying a first layer of shredded paper to the lower web, adding the reinforcing material, and then applying a second layer of shredded paper on top of the reinforcing material, followed by applying the upper web. Such reinforcing materials can be a webbing of glass fiber, prepolyester, fibrilated high density polyethylene terephthalate, metallic fibers, scrim, or other suitable substances or layers.

Conceivably, other variations can be applied to the system and/or method to suit particular circumstances and applications.

The above description is that of exemplary and preferred embodiments of the invention. Since various alterations and changes can be made without departing from the spirit and broader aspects of the invention as set forth in the appended claims, the invention is not intended to be limited to the illustrative embodiments and examples presented, but only by the claims which are to be interpreted in accordance with the principles of patent law, including the doctrine of equivalents.

The embodiments of the invention in which an exclusive property or privilege is claimed are defined as follows:

1. Apparatus for continuously fabricating pressboard with a filler comprising shredded paper coated with a thermoplastic material and a pair of webs comprising:
    web advancing means for advancing first and second webs toward each other;
    means for placing thermoplastic coated shredded paper between said webs to form a composite with said webs, said composite having a thickness; and
    processing means for applying heat to said composite and for simultaneously shifting said first and second webs linearly back and forth relative to each other and to said shredded paper to smear said thermoplastic for bonding said composite together;
    said processing means including a plurality of heated rolls for operation at a predetermined peripheral speed, and defining a serpentine path through which said composite is passed, such that around each one of said heated rolls one of said webs is in engagement with the said one heated roll to form an inner web which is pulled forwardly to move relative to the other webs;

press rolls downstream of said heated rolls, and defining a gap through which said composite passes to reduce said thickness to a desired caliper; and drive means for causing a greater peripheral speed of said press rolls than said peripheral speed of said heated rolls to produce an overdrive relation relative to said heated rolls, resulting in a differential pulling action on said webs to thereby cause said webs to move linearly relative to each other.

2. An apparatus for continuously fabricating pressboard from a filler comprising shredded paper coated with a thermoplastic material and a pair of webs comprising:

means for conveying a first continuous web along a predetermined path;

depositing means for depositing shredded polymer coated paper onto said first web;

applying means for applying a second continuous web onto the shredded coated paper, whereby a composite is formed with the shredded coated paper located between the first and second webs;

processing means for heating said composite, for shifting said webs linearly back and forth relative to each other and relative to said shredded coated paper to cause polymer smearing and web-to-paper rubbing to enhance bonding of the webs and shredded coated paper together; and at least one pair of pressing rolls operated at a predetermined peripheral speed and positioned downstream of said processing means for heating said composite, to press said composite, after said shifting, for bonding said composite and reducing its thickness; and drive means for causing said peripheral speed of said pressing roll means to be greater than that of said heated driven rolls to cause relative linear movement between said webs and inhibit formation of bulges in the webs on said serpentine path.

3. The apparatus of claim 2 in which said processing means includes a plurality of heated driven rolls defining a serpentine path through which said composite is passed while said back and forth linear shifting is caused.

4. The apparatus in claim 3 including preheat roll means for preheating said webs to drive off moisture and gases.

5. Apparatus for continuously fabricating pressboard from a pair of webs and a filler comprising shredded paper coated with a thermoplastic material, comprising:

web advancing means for continuously advancing a pair of webs toward each other;

means for continuously depositing shredded paper coated with thermoplastic material between the advancing webs to form a composite;

processing means for treating said composite including, a) heating means for softening the thermoplastic material on the shredded paper, and b) means comprising a series of heated rolls arranged to move said composite in a serpentine path at a predetermined speed of advancement for repeatedly shifting said webs back and forth relative to each other and to said shredded paper sufficiently to smear the softened thermoplastic material;

driven pressing means for pulling and pressing said composite to bond said webs and shredded paper together with said smeared thermoplastic material to form pressboard; and said driven pressing means comprising at least one pair of cooperative rolls driven at a greater peripheral speed than said speed of advancement of said composite, to thereby cooperate with said back and forth movement of said webs relative to each other and to said shredded paper.

* * * * *

UNITED STATES PATENT AND TRADEMARK OFFICE
CERTIFICATE OF CORRECTION

PATENT NO. : 5,380,180
DATED : January 10, 1995
INVENTOR(S) : Vernon L. Lamb, Sr.

It is certified that error appears in the above-indentified patent and that said Letters Patent is hereby corrected as shown below:

Column 1, line 10;
"RESTIVE" should be -- RELATIVE --;

Column 1, lines 23 and 24;
"maternal" should be -- material --;

Column 1, line 46;
After "recycled" insert -- in --;

Column 2, line 40;
"slid" should be -- slip --;

Column 4, line 2;
After "primarily" delete -- ; --;

Column 4, line 63;
After "rolls of" insert -- a --.

Signed and Sealed this

Twelfth Day of September, 1995

Attest:

BRUCE LEHMAN

Attesting Officer     Commissioner of Patents and Trademarks